July 15, 1958 W. G. REGAN 2,843,193
CLIP FOR SINUOUS SPRINGS
Filed Sept. 6, 1956
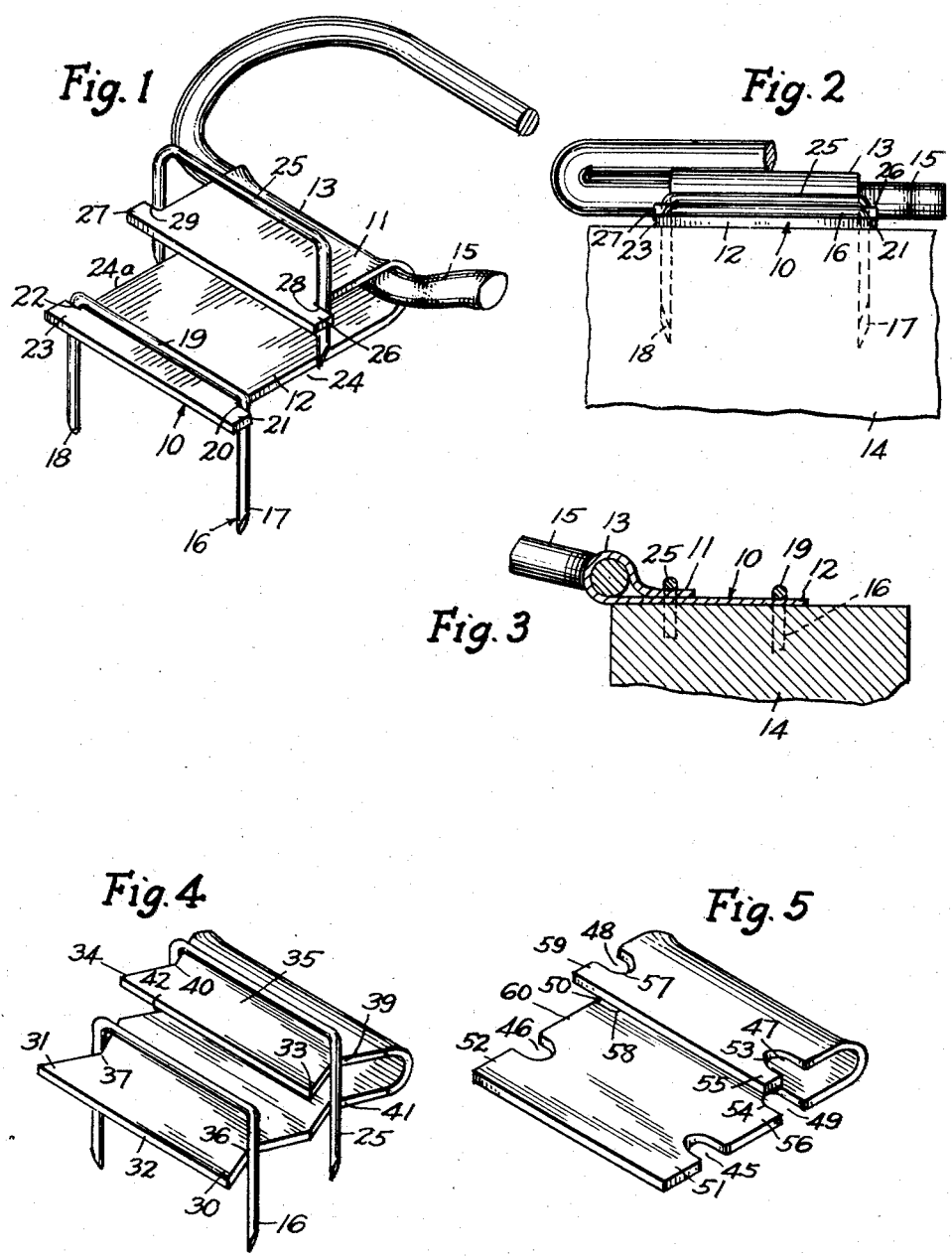
INVENTOR.
William G. Regan
BY Harry Jacobson
ATTORNEY

United States Patent Office 2,843,193
Patented July 15, 1958

2,843,193

CLIP FOR SINUOUS SPRINGS

William G. Regan, Shrewsbury, Mass., assignor to Kay Manufacturing Corporation, Brooklyn, N. Y., a corporation of New York Application September 6, 1956, Serial No. 608,398

6 Claims. (Cl. 155—179)

This invention relates to clips for securing the ends of sinuous springs to a furniture frame or the like.

As shown for example, in Patent No. 2,215,373, such clips are frequently made initially open, with a pair of parallel flanges integrally joined at one end by a bend, the upper flange being shorter than the lower. Aligned holes in the flanges receive headed nails which are driven into the wooden furniture frame to fix the clip in place and to close it around the end portion of a sinuous spring, the spring extending across the frame usually from front to back.

The necessity for holding and driving nails by hand while the clip is also held by hand has proven to be uneconomical, and attempts have been made to use more efficient tools such as a combined nail magazine and driver. However, such attempts still have not sufficiently reduced the cost of effectively securing in place the sinuous spring ends, and there remains an insistent demand for a clip which can be rapidly and economically as well as durably assembled with the spring end to the frame.

The present invention therefore contemplates the provision of a clip wherein means are provided for engaging or abutting against the legs of a U-shaped staple, and preventing relative movement of the clip and the staple, the clip-closing staple for both flanges being driven rapidly and accurately by a suitable power-driven staple gun to straddle both flanges and thereby to close the clip around the spring end. The staple for the lower flange is usually driven first to straddle said flange before the spring end is inserted between the flanges, especially if the spring is stressed and therefore difficult to handle and hold.

The various objects of the invention will be clear from the description which follows and from the drawings, in which Fig. 1 is a perspective view of one form of the clip in the open position thereof, showing the spring end inserted thereinto, the lower-flange in its driven position and the clip-closing staple driven partway down.

Fig. 2 is a fragmentary front elevational view of the assembled frame, clip, staples and spring.

Fig. 3 is a vertical longitudinal sectional view thereof.

Fig. 4 is a perspective view of a modified form of the clip showing the arrangement of the staples.

Fig. 5 is a similar view of another modified form of the clip.

Referring now to Figs. 1-3, the clip 10 is illustrated as made of sheet metal, with the shorter imperforate upper flange 11, the longer imperforate lower flange 12 and the integral bend 13 joining the flanges. It will be understood that when staples are driven by a powered staple gun, the operator need use only one hand to hold the clip 10 and the other to operate the gun to drive the lower-flange staple 16 into the frame 14 of an article of furniture or the like, such as a seat or back. Said staple is preferably of the generally U-shaped type having the legs 17, 18 and the head 19. To prevent relative movement of the clip and the driven staple, means are provided adjacent the side edges of the clip to engage or abut against the staple legs 17, 18 while and after the staple is driven. As best seen in Fig. 1, said means takes the form of an edge 20 on the transversely extending and generally rectangular projection 21 at the free end portion of one side of the lower flange, to engage the staple leg 17, and a similar edge 22 on the opposed projection 23 at the opposite side of the flange to engage the staple leg 18. Each side portion of the clip has a substantially rectangular cut-out as 24 on one side and 24a on the other side extending beyond the projections 21 and 22 to reduce the width of the flanges and to permit the staple legs to pass into the frame so that the head 19 of the staple straddles the narrowest portion of the flange between the cut-outs 24 and 24a. Obviously, the lower flange is held down by the staple over a large area and is therefore fixed in position better than by a nail.

With the lower flange so fastened to the frame 14 and the spring end 15 inserted between the flanges to the bend 13, the clip-closing staple 25 is driven to close the clip as shown in Figs. 2 and 3, and to fasten it to the frame. The upper flange 11 is provided at its free end with projections 26, 27 similar to those on the lower flange, the rectangular cut-outs 24 and 24a at the sides of the clip continuing to the inner edges 28, 29 of said projections. When the flange 11 is bent around the spring end 15 by the driven staple 24, said staple straddles the flanges and relative movement of the clip and staple is adequately prevented. The staple 16 may be omitted in making the first tie, that is, in fixing the unstressed spring at one end to the frame, because the spring and clip can then be held in one hand with relative ease.

In Fig. 4 is shown a somewhat different form of the means for preventing relative displacement of the clip and staple. The inclined staple-engaging edges result from cut-outs of triangular shape made in the side edge portions of the clip. Said cut-outs form generally triangular projections 30, 31 at the free end of the lower flange 32 of the clip, and form similar projections 33, 34 at the free end of the upper flange 35. Other cut-outs in the side edges of the lower flange in positions directly underneath the upper flange cut-outs, are similar to the cut-outs in the upper flange and are respectively vertically aligned therewith in the open position of the clip. The legs of the lower-flange staple 16 are preferably driven at the respective vertices 36, 37 of the outer cut-out in the lower flange, in the same manner as explained in connection with Fig. 1, the staple straddling the flange. The legs of the clip-closing staple 25 are similarly driven at the vertices 39, 40 of the respective opposed cut-outs in the side edges of the upper flange and also engage the respective vertices 41, 42 of the inner cut-outs in the lower flange, which cut-outs are vertically aligned respectively with those corresponding vertices of the upper flange to permit the staple legs to pass the lower flange and to enter the frame.

In Fig. 5, the edge cut-outs 45, 46, 47, 48, 49 and 50 are of generally semi-circular form, the legs of the staple 16 being arranged to engage the edges of the respective projections 51, 52 of the cut-outs 45 and 46 with the staple straddling the lower flange. One leg of the clip-closing staple 25 engages the aligned edges 53, 54 of the respective corresponding projections 55, 56 in the flanges, while the other leg similarly engages the aligned edges 57, 58 of the opposed projections 59, 60.

Since the cut-outs may obviously take a variety of different shapes, changes in the shapes of the cut-outs shown and described may be made without departing from the spirit of the invention defined by the appended claims.

I claim:

1. A clip for the end of a sinuous spring, said clip comprising an upper flange, a lower flange and a bend integrally joining said flanges, said clip having alternating projections and indentations in the side edges thereof, said indentations reducing the width of the clip at selected parts of said edges to a width less than the greatest width of said flanges, said edges being adapted to cooperate with the legs of a staple straddling the clip and within the indentations and inwardly of the projections for preventing relative movement of the clip and staple, the indentations and projections in one side edge of one flange being opposed to the indentations and projections in the opposite side edge and being aligned vertically with the indentations and projections in the corresponding side edge of the other flange.

2. The clip of claim 1, the indentations and projections being of generally rectangular form.

3. The clip of claim 1, the indentations and projections being of generally triangular form.

4. The clip of claim 1, the indentations and projections being of generally semi-circular form.

5. The combination with the end of a sinuous spring and a frame, of a clip having a pair of initially parallel flanges and having opposed cut-outs in the side edges thereof forming indentations and projections in said side edges, a pair of opposed cut-outs in the opposite side edges of the upper flange being aligned with a corresponding pair of cut-outs in the corresponding side edges of the lower flange, and a U-shaped staple straddling both flanges and having a pair of legs spaced apart a distance greater than the least width of said flanges at the indentations and less than the greatest width of said flanges at the adjacent projections, said legs passing through two pairs of aligned indentations and into engagement with the edges of said projections and passing into the frame to depress the upper flange toward the lower flange after the end of the sinuous spring has been inserted therebetween.

6. In a spring structure having a frame and a sinuous spring extending across the frame, means for securing an end of the spring to a side of the frame comprising a clip having an upper flange of non-uniform width, a lower flange of non-uniform width and longer than the upper flange and an integral bend joining the flanges, the respective side edges of the flanges being provided with indentations reducing the width of and similarly shaping the respective flanges at corresponding selected parts of opposed edges thereof whereby the width of each flange varies at different places along the length thereof and outwardly extending projections are provided along said side edges, and the selected and shaped parts of the edges of the upper flange being vertically aligned with the correspondingly shaped selected parts of the edges of the lower flange, a staple having a pair of substantially parallel legs arranged respectively outside of the side edges and within opposed indentations and inwardly of the projections to straddle the flange and thereby to prevent the flange from lifting, twisting or shifting off the frame.

References Cited in the file of this patent

UNITED STATES PATENTS

| | | |
|---|---|---|
| 2,166,989 | Gleason | July 25, 1939 |
| 2,215,373 | Krakauer | Sept. 17, 1940 |